(12) United States Patent  
Hamaguchi et al.

(10) Patent No.: US 10,227,242 B2  
(45) Date of Patent: Mar. 12, 2019

(54) MEMBRANE ELECTRODE ASSEMBLY AND ELECTROLYZED WATER PRODUCTION DEVICE USING THE SAME

(71) Applicant: INDUSTRIE DE NORA S.P.A, Milan (IT)

(72) Inventors: Katsumi Hamaguchi, Fujisawa (JP); Takaaki Nakai, Fujisawa (JP); Takayuki Yamamoto, Fujisawa (JP)

(73) Assignee: INDUSTRIE DE NORA S.P.A., Milan (IT)

( * ) Notice: Subject to any disclaimer, the term of this patent is extended or adjusted under 35 U.S.C. 154(b) by 359 days.

(21) Appl. No.: 14/893,353

(22) PCT Filed: Jun. 4, 2014

(86) PCT No.: PCT/EP2014/061597  
§ 371 (c)(1),  
(2) Date: Nov. 23, 2015

(87) PCT Pub. No.: WO2014/195365  
PCT Pub. Date: Dec. 11, 2014

(65) Prior Publication Data  
US 2016/0101997 A1    Apr. 14, 2016

(30) Foreign Application Priority Data  
Jun. 5, 2013   (JP) ................... 2013-119022

(51) Int. Cl.  
*C25B 1/10* (2006.01)  
*C25B 15/02* (2006.01)  
(Continued)

(52) U.S. Cl.  
CPC ........ *C02F 1/46109* (2013.01); *C02F 1/4672* (2013.01); *C25B 1/13* (2013.01);  
(Continued)

(58) Field of Classification Search  
CPC .... C25B 9/08; C25B 1/10; C25B 1/00; C25B 15/02; C25B 1/26; C02F 2201/46115; C02F 1/46104; C02F 2001/46147  
(Continued)

(56) References Cited

U.S. PATENT DOCUMENTS 3,080,310 A    3/1963   Lindenmaier et al.  
3,878,082 A    4/1975   Gohhale  
(Continued)

FOREIGN PATENT DOCUMENTS

EP   0008165 A1    2/1980  
JP   H08311681 A   11/1996  
WO   00/43575 A2    7/2000

OTHER PUBLICATIONS

International Search Report based on International Application No. PCT/EP2014/061597 dated Dec. 22, 2014. (4 pages).

*Primary Examiner* — Zulmariam Mendez  
(74) *Attorney, Agent, or Firm* — Lucas & Mercanti, LLP

(57) ABSTRACT

A membrane electrode assembly includes a rod-shaped or tubular anode, an anode terminal connected to the anode, a cathode disposed at a position apart from the anode so as to face the anode, and a membrane that separates the anode from the cathode. The cathode includes a line-shaped or strip-shaped cathode-supporting portion and a cathode claw that extends to the left, right, or both left and right from the cathode-supporting portion and that is curved along an outer periphery of the anode. The cathode-supporting portion and the cathode claw form an anode-holding portion of the cathode. The membrane includes a membrane strip, and the membrane strip is disposed on the cathode claw to be in contact with the cathode claw so that the anode is held by the anode-holding portion of the cathode with the membrane strip therebetween.

17 Claims, 6 Drawing Sheets

(51) Int. Cl.
  *C25C 7/02*    (2006.01)
  *C25D 17/10*   (2006.01)
  *C25D 7/04*    (2006.01)
  *C02F 1/461*   (2006.01)
  *C02F 1/467*   (2006.01)
  *C25B 1/13*    (2006.01)
  *C25B 1/30*    (2006.01)
  *C25B 9/08*    (2006.01)

(52) U.S. Cl.
  CPC ................. *C25B 1/30* (2013.01); *C25B 9/08* (2013.01); *C02F 2001/46147* (2013.01); *C02F 2001/46152* (2013.01); *C02F 2001/46171* (2013.01); *C02F 2201/46115* (2013.01)

(58) Field of Classification Search
  USPC ................................................ 204/242, 252
  See application file for complete search history.

(56) References Cited

U.S. PATENT DOCUMENTS

| | | |
|---|---|---|
| 3,980,544 A | 9/1976 | Adams et al. |
| 4,268,372 A | 5/1981 | Iizima et al. |
| 4,329,217 A | 5/1982 | Byrd et al. |
| 2009/0127128 A1* | 5/2009 | Kitaori ................. A61L 2/0088 |
| | | 205/464 |

* cited by examiner

MEMBRANE ELECTRODE ASSEMBLY AND ELECTROLYZED WATER PRODUCTION DEVICE USING THE SAME

CROSS-REFERENCE TO RELATED APPLICATIONS

This application is a U.S. national stage of PCT/EP2014/061597 filed on Jun. 4, 2014 which claims the benefit of priority from Japanese Patent Application No. 2013-119022 filed Jun. 5, 2013, the contents of each of which are incorporated herein by reference.

BACKGROUND OF THE INVENTION

1. Field of the Invention

The present invention relates to a compact membrane electrode assembly that can simply produce electrolyzed water containing ozone, hydrogen peroxide, hypochlorous acid, and the like at home or elsewhere and a compact or portable electrolyzed water production device using the membrane electrode assembly.

2. Description of the Related Art

The usage of electrolyzed water has been described in publications related to the establishment of the JIS standard for a household electrolyzed water production device in 2005, the hygiene management standards for school lunches and a manual related thereto that were established by the Ministry of Education, Culture, Sports, Science and Technology in 2009, and the guidelines for the Japan Food Hygiene Association published under the supervision of the Ministry of Health, Labor, and Welfare in 2009. Thus, attention has been recently focused on an electrolyzed water production device.

The term "electrolyzed water" is a generic name of an aqueous solution obtained by electrolyzing raw material water such as pure water, tap water, soft water, or a dilute saline solution by applying a direct-current voltage, the aqueous solution containing an electrolyzed product such as ozone, hydrogen peroxide, hypochlorous acid, or a mixture thereof. Electrolyzed water production devices usually have a two-chamber or three-chamber structure in which solutions or gases that are present on the anode side and the cathode side are physically separated from each other. However, in some electrolysis processes, mixing an anolyte and a catholyte together is necessary or permitted. In such a case, the electrolyzed water production device used also has a one-chamber structure accordingly.

In the case where an electrolyzed water production device has a two-chamber or three-chamber structure, "acidic electrolyzed water" is obtained on the anode side. Main components of the acidic electrolyzed water are ozone water, hydrogen peroxide water, and hypochlorous acid water. On the other hand, "alkaline electrolyzed water" is obtained on the cathode side. In the case where an electrolyzed water production device having the one-chamber structure is used, a mixture of acidic electrolyzed water and alkaline electrolyzed water is obtained as electrolyzed water.

Japanese Unexamined Patent Application Publication Nos. 2006-346203, 2008-73604, 2008-127583, 2009-125628, and 2009-138262 disclose a membrane electrode assembly and an electrolyzed water production device using the membrane electrode assembly. The membrane electrode assembly and the electrolyzed water production device are characterized in that a strip-shaped ion exchange membrane is provided around the circumference of a rod-shaped or tubular anode in the form of rings or in a spiral manner, or a tubular ion exchange membrane is provided around the circumference of a rod-shaped or tubular anode in a tubular manner, and a strip-shaped or a line-shaped cathode is wound around the surface of the ion exchange membrane in the form of rings or in a spiral manner.

The membrane electrode assembly and the electrolyzed water production device using the membrane electrode assembly have the following structure: A membrane electrode assembly is prepared by providing a strip-shaped or tubular ion exchange membrane around a rod-shaped or tubular anode, and winding a strip-shaped or a line-shaped cathode around the surface of the ion exchange membrane. The membrane electrode assembly is fixed in a tube, and a power feeding terminal is connected to the anode and/or the cathode in the tube, thus forming an electrolysis unit. This electrolysis unit, a container that stores raw material water, and a head form an electrolyzed water ejection device. Electrolyzed water produced by electrolyzing the raw material water with the electrolysis unit is ejected from the head.

According to the membrane electrode assembly and the electrolyzed water production device described in the above patent documents, the size of the device can be reduced, a raw material aqueous solution can be electrolyzed by using the compact device, and the produced electrolyzed water can be immediately ejected and used.

As described above, in the membrane electrode assembly produced by providing a strip-shaped ion exchange membrane around the circumference of a rod-shaped or tubular anode in the form of rings or in a spiral manner or providing a tubular ion exchange membrane around the circumference of a rod-shaped or tubular anode in a tubular manner, and winding a strip-shaped or a line-shaped cathode around the surface of the ion exchange membrane in the form of rings or in a spiral manner, and the electrolyzed water production device using the membrane electrode assembly, the anode, the membrane, and the cathode are integrated with each other. Accordingly, once the membrane electrode assembly is produced, the membrane electrode assembly is easily handled and can be easily installed in the device. In addition, by adjusting the diameter of the rod-shaped or tubular anode, the cross-sectional shape of the anode, the thickness and the width of the ion exchange membrane, and in the case of a line-shaped cathode, the interval of the winding, by appropriately selecting the diameter of the tube that houses this assembly to form a counter electrode chamber, and by appropriately determining the number of rod-shaped or tubular anodes used, a gas-liquid flow path suitable as an anode chamber and a cathode chamber is formed. In addition, the concentration of an electrolyte species in the electrolyzed water can be set to a desired value by changing the amount of water supplied and the current value. Furthermore, sterilization can be performed with the electrolyte species at the desired concentration by ejecting or spraying the obtained electrolyzed water onto a target object.

However, the electrolyzed water production device using the membrane electrode assembly described in the above patent documents has the following problems: Since a strip-shaped or a line-shaped cathode is wound around the surface of an ion exchange membrane in the form of rings or in a spiral manner (hereinafter, this electrode is referred to as "wound-type electrode"), it takes time to wind the line-shaped cathode around the surface of an ion exchange membrane, and it is difficult to make the strength of the winding and the interval of the winding uniform. In addition, in this wound-type electrode, the fixing performance (holding force) of the cathode wire and the ion exchange membrane may decrease. In the case where the size of the electrolyzed water production device is reduced, a skilled process is necessary for producing the device. Thus, it is difficult to mechanize the process, resulting in an increase in the production cost.

The following two methods are conceivable as a method for fixing (holding) the cathode wire and the ion exchange membrane on the wound-type diamond electrode.

(1) First Fixing Method (Non-Binding Method)

A strip-shaped ion exchange membrane is wound around an anode constituted by a rod-shaped diamond electrode, and a cathode wire is then wound around the ion exchange membrane in a spiral manner. Thus, the cathode wire is plastically deformed to fix the cathode wire and the ion exchange membrane. After the winding, the cathode wire is somewhat rewound by springback. However, due to the elasticity of the ion exchange membrane, the cathode wire and the ion exchange membrane are held on the anode constituted by a rod-shaped diamond electrode in a close contact manner.

(2) Second Fixing Method (Binding Method)

In the case where the number of windings is small or the cathode wire is thin, the force for holding the ion exchange membrane is smaller than the case described above. Therefore, rewinding is suppressed by, for example, strongly winding the cathode wire a plurality of times in a close contact manner at the beginning and at the end of winding of the cathode wire. Thus, the cathode wire and the ion exchange membrane are held on the anode constituted by a diamond electrode.

In general, from the standpoint of complication of the process and the cost, the non-binding method, which is the first fixing method, is preferably employed as the method for fixing (holding) the cathode wire and the ion exchange membrane on the anode constituted by a diamond electrode.

However, in the case where the non-binding method is employed and the size of the existing wound-type diamond electrode having a cathode wire fixed in a non-binding manner is reduced, the following problems occur: Specifically, when the number of windings of the cathode wire is reduced, the frictional force in an axial direction of the diamond electrode is decreased in accordance with the reduced number of windings. As a result, the cathode wire and the ion exchange membrane easily shift in the axial direction.

Furthermore, when the number of windings is reduced (for example, to about 1 to 3), since the beginning and the end of the winding are not bound, the holding force (pressure) of the cathode wire that presses the ion exchange membrane onto the diamond electrode decreases. Accordingly, in the case where electrolysis is performed at a certain current density using a diamond electrode having a small number of windings of the cathode wire, it is believed that the voltage of the diamond electrode becomes higher than that of the case where the number of windings of the cathode wire is larger. Thus, in the case where the existing wound-type diamond electrode is used and the number of windings of the cathode wire is reduced, it is necessary to fix both ends of the cathode wire by binding so that the cathode wire and the ion exchange membrane do not shift in the axial direction of the diamond electrode and a stable force for holding the ion exchange membrane is obtained.

On the other hand, in the case where the binding method, which is achieved by the second fixing method, is employed and the size of the diamond electrode is reduced (that is, the number of windings is reduced), the amount of material of the anode constituted by a diamond electrode and the process of the winding are reduced, thereby reducing the cost. However, the setup (the number of steps) of the process of the winding does not change. Consequently, the ratio of the cost of the process of the winding to the total cost of the diamond electrode increases. In addition, since it is necessary to fix the two ends of the cathode wire by binding, the step of binding is increased.

As described above, in the case where a compact diamond electrode is produced by reducing the number of windings in the existing wound-type diamond electrode, the production cost of the diamond electrode per the amount of $O_3$ generated is significantly increased.

As a solution to the problems (such as destabilization in the fixing of the shape due to a decrease in the force for holding an ion exchange membrane with a cathode wire, an increase in the electrolytic cell voltage, fixing of both ends of a cathode wire for suppressing these problems, and an increase in the man-hour caused thereby) caused in the reduction in the size of the diamond electrode, the present invention provides a clip-type membrane electrode assembly in which a clip-shaped cathode is used instead of a cathode wire.

SUMMARY OF THE INVENTION

To solve the above problems, the present invention provides a compact membrane electrode assembly which can simply produce electrolyzed water containing ozone, hydrogen peroxide, hypochlorous acid, and the like at home or elsewhere and through which sterilization or disinfection can be performed by using the produced electrolyzed water, the membrane electrode assembly having a novel clip-type electrode structure instead of the existing wound-type electrode structure. The present invention also provides a compact or portable electrolyzed water production device using the membrane electrode assembly.

A first aspect of the present invention provides a membrane electrode assembly including a rod-shaped or tubular anode; an anode terminal connected to the anode; a cathode disposed at a position apart from the anode so as to face the anode; and a membrane that separates the anode and the cathode from each other, in which the cathode includes a line-shaped or strip-shaped cathode-supporting portion and a cathode claw that extends to the left, right, or both left and right from the cathode-supporting portion and that is curved along an outer periphery of the anode, the cathode-supporting portion and the cathode claw form an anode-holding portion of the cathode, the anode-holding portion holding the anode, the membrane includes a membrane strip, and the membrane strip is disposed on the cathode claw to be in contact with the cathode claw so that the anode is held by the anode-holding portion of the cathode with the membrane strip therebetween.

The cathode may include a cathode power feed portion, the anode terminal may include an anode terminal power feed portion, and the cathode power feed portion and the anode terminal power feed portion may be arranged to extend in the same direction.

The cathode claw may include a left cathode claw portion and a right cathode claw portion that extend from the cathode-supporting portion in a bilaterally symmetric manner.

More than one pair of the left cathode claw portion and the right cathode claw portion may be provided, and the cathode claw may extend to the left and right from the cathode-supporting portion and may have a comb shape.

The membrane strip may be arranged to be continuously in contact with the left cathode claw portion and the right cathode claw portion.

Tips of the left cathode claw portion and the right cathode claw portion may be curved outward so that the anode-holding portion of the cathode substantially has the shape of the letter Ω when viewed from an axial direction of the anode.

The anode terminal may include a line-shaped or strip-shaped anode terminal-supporting portion and an anode terminal claw that extends to the left and right from the anode terminal-supporting portion and that is curved along an outer periphery of the anode, and the anode terminal-supporting portion and the anode terminal claw may form an anode-holding portion of the anode terminal, the anode-holding portion holding the anode.

The anode terminal claw may be curved so that the anode-holding portion of the anode terminal substantially has the shape of the letter Ω or the letter C when viewed from an axial direction of the anode.

The anode may have a length of 3 mm or more and 100 mm or less.

The anode may have an outer diameter of 0.5 mm or more and 10 mm or less.

The membrane strip may have a thickness of 0.1 mm or more and 2 mm or less.

The membrane strip may have a width of 0.2 mm or more and 5 mm or less.

The anode may be an electrically conductive diamond electrode.

The membrane may be an ion exchange membrane.

A second aspect of the present invention provides an electrolyzed water production device including the membrane electrode assembly according to the first aspect of the present invention, in which raw material water is electrolyzed by using the membrane electrode assembly to produce electrolyzed water.

The electrolyzed water production device may further include a container that stores the raw material water, in which the raw material water is electrolyzed by supplying power to the membrane electrode assembly to produce electrolyzed water.

The electrolyzed water production device may further include a water flow portion through which the raw material water is allowed to pass, in which the raw material water is electrolyzed by supplying power to the membrane electrode assembly to produce electrolyzed water.

According to the above aspects of the present invention, since the novel clip-type membrane electrode assembly structure is adopted instead of the existing wound-type electrode structure, the advantages described below can be achieved.

(1) The size of the membrane electrode assembly can be reduced. Specifically, according to the present invention, the dimensions of the membrane electrode assembly are small, the degree of freedom of the installation location is high, and thus the versatility of a compact membrane electrode assembly is increased.

(2) A stable performance is improved. Specifically, according to the present invention, electrolysis can be performed while an ion exchange membrane is held on an anode at a stable pressure.

(3) Productivity is improved. Specifically, according to the present invention, the fabrication of a membrane electrode assembly is simplified from the method of winding a cathode wire to the method of fitting an ion exchange membrane into a cathode together with an anode, thereby improving productivity.

(4) The cost of equipment can be reduced. Specifically, according to the present invention, the fabrication can be performed not by an expensive winding machine but by an inexpensive fitting machine.

DESCRIPTION OF THE PREFERRED EMBODIMENTS

An embodiment of a membrane electrode assembly of the present invention will now be described with reference to the drawings.

Figure 1A:
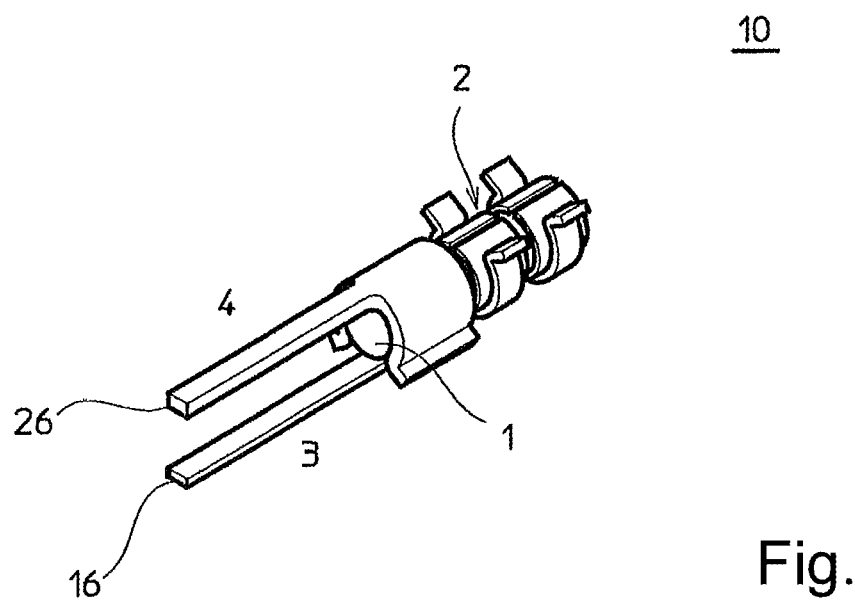
FIG. 1A is a perspective view illustrating a membrane electrode assembly according to an embodiment of the present invention.

FIGS. 1A to 1D illustrate an embodiment of the present invention. As illustrated in FIG. 1A, a membrane electrode assembly 10 of the present invention includes a rod-shaped or tubular anode 1, an anode terminal 4 that is electrically connected to the anode 1, a cathode 3 disposed at a position apart from the anode 1 so as to face the anode 1, and a membrane 2 that separates the anode 1 and the cathode 3 from each other.

Figure 1B:
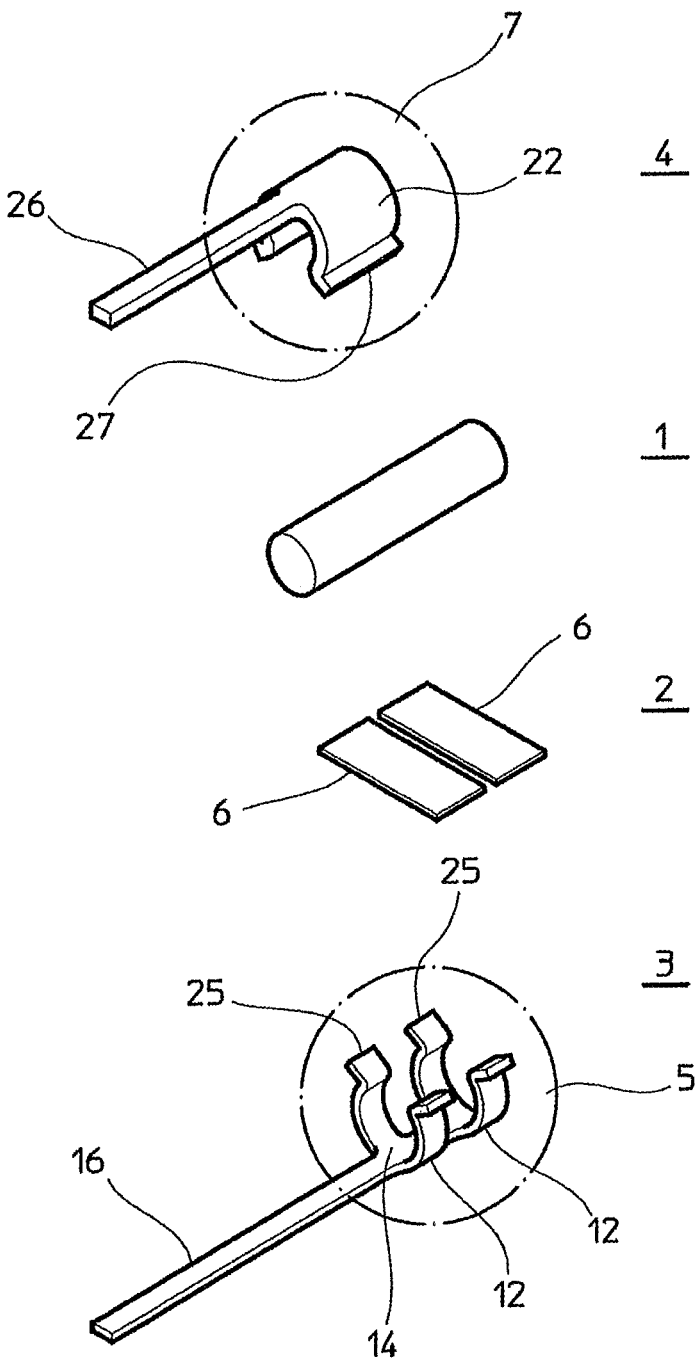
FIG. 1B is an assembling drawing of the membrane electrode assembly illustrated in FIG. 1A, according to an embodiment of the present invention.
Figure 1C:
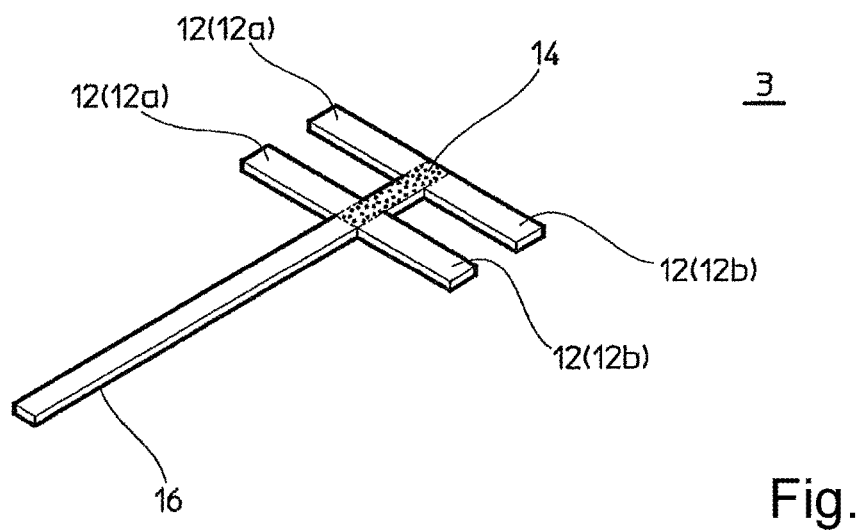
FIG. 1C is a development view of a cathode 3 of the membrane electrode assembly illustrated in FIG. 1A, according to an embodiment of the present invention.

As illustrated in FIGS. 1B and 1C, the cathode 3 includes a line-shaped or strip-shaped cathode-supporting portion 14 and a cathode claw 12 that extends to the left and right from the cathode-supporting portion 14 and that is curved along an outer periphery of the anode 1. The cathode-supporting portion 14 and the cathode claw 12 form an anode-holding portion 5 of the cathode 3, the anode-holding portion 5 holding the anode 1. The membrane 2 includes membrane strips 6. The membrane 2 including the membrane strips 6 is disposed on the cathode claw 12 to be in contact with the cathode claw 12. Thus, the anode 1 is held by the anode-holding portion 5 of the cathode 3 with the membrane strips 6 therebetween. The cathode claw 12 includes a left cathode claw portion 12a and a right cathode claw portion 12b that extend from the cathode-supporting portion 14 in a bilaterally symmetric manner. At least one pair of the left cathode claw portion 12a and the right cathode claw portion 12b is provided. The cathode claw 12 extends to the left and right from the cathode-supporting portion 14 and has a comb shape. The membrane strips 6 are each arranged to be continuously in contact with the left cathode claw portion 12a and the right cathode claw portion 12b.

The left cathode claw portions 12a and right cathode claw portions 12b that extend from the cathode-supporting portion 14 in a bilaterally symmetric manner may extend only to the left side or the right side of the cathode-supporting portion 14. Furthermore, each of the membrane strips 6 may not continuously contact the left cathode claw portion 12a and the right cathode claw portion 12b. Alternatively, the membrane strip 6 may contact the cathode claw 12 with a gap in the axial direction of the cathode-supporting portion 14.

When the anode 1 is held by the anode-holding portion 5 of the cathode 3, the membrane 2 including the membrane strips 6 must contact the outer surface of the anode 1. Therefore, it is necessary that the membrane 2 be inserted into the anode-holding portion 5 of the cathode 3 from the cathode claw 12. For this purpose, the cathode claw 12 substantially has the shape of the letter Ω when viewed from the axial direction of the anode 1, and a guiding portion 25 of the cathode claw 12 is formed so that tips of the cathode claw 12 are curved outward. With this structure, the anode 1 can be easily inserted into the anode-holding portion 5 of the cathode 3.

It is necessary that the cathode claw 12 include at least one pair of the left cathode claw portion 12a and right cathode claw portion 12b in accordance with the amount of reaction products required (such as the amount of water and the concentration) so that a uniform flow of an electrolyte solution is provided around each of the cathode claw portions (electrolysis portions) and a good electrolysis efficiency is obtained as a whole.

Regarding the membrane strip 6, from the standpoint of the flow of the electrolyte solution, a plurality of membrane strips 6 are preferably provided so as to contact the surface of the anode 1 with a gap therebetween. However, from the standpoint of the ease of preparation of the membrane strip 6, the membrane strip 6 may be a single strip. In this case, a plurality of openings are preferably provided in the strip so as to enhance gas-liquid permeability.

Figure 1D:
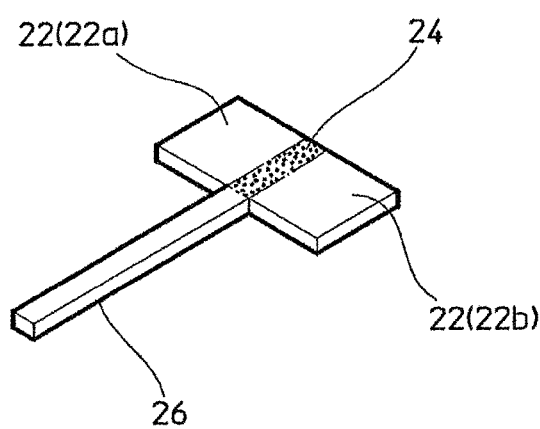
FIG. 1D is a development view of an anode terminal 4 of the membrane electrode assembly illustrated in FIG. 1A, according to an embodiment of the present invention.

As illustrated in FIG. 1D, the anode terminal 4 includes a line-shaped or strip-shaped anode terminal-supporting portion 24 and an anode terminal claw 22 that extends to the left and right from the anode terminal-supporting portion 24 and that is curved along an outer periphery of the anode 1. The anode terminal-supporting portion 24 and the anode terminal claw 22 form an anode-holding portion 7 of the anode terminal 4, the anode-holding portion 7 holding the anode 1. The anode terminal claw 22 is curved so that the anode-holding portion 7 of the anode terminal 4 substantially has the shape of the letter Ω or the letter C when viewed from the axial direction of the anode 1.

The holding of the anode 1 by the anode-holding portion 7 of the anode terminal 4 may be achieved in a fitting manner or in a sliding manner. Therefore, the anode terminal claw 22 may substantially have the shape of the letter Ω or the shape of the letter C. A guiding portion 27 of the anode terminal claw 22 is formed at tips of the anode terminal claw 22. The guiding portion 27 is suitable for the case where the anode 1 is held by the anode-holding portion 7 of the anode terminal 4 in a fitting manner.

The holding range of the anode 1 by the cathode claw 12 of the anode-holding portion 5 of the cathode 3 is preferably about ¾(270°) of the circumference of the anode 1 so that the anode 1 is easily inserted into the anode-holding portion 5 of the cathode 3 and moderately held by the cathode claw 12.

The holding of the anode 1 by the anode terminal claw 22 of the anode-holding portion 7 of the anode terminal 4 may be achieved in a fitting manner or a sliding manner.

In FIGS. 1A to 1D, an anode terminal power feed portion 26 is integrally formed with the line-shaped or strip-shaped anode terminal-supporting portion 24 of the anode terminal 4, and a cathode power feed portion 16 is integrally formed with the line-shaped or strip-shaped cathode-supporting portion 14 of the cathode 3. The present embodiment describes a structure of a one-side terminal membrane electrode assembly in which the cathode power feed portion 16 and the anode terminal power feed portion 26 extend from one side of the anode 1.

In fabricating the membrane electrode assembly of the present invention, first, more than one pair of the left cathode claw portions 12a and the right cathode claw portions 12b of the cathode claw 12 are curved along an outer periphery of the anode 1. As illustrated in FIG. 1C, the left cathode claw portions 12a and the right cathode claw portions 12b are formed in advance so as to extend to the left and right from the cathode-supporting portion 14 of the cathode 3 in a comb shape. Thus, the anode-holding portion 5 of the cathode 3 illustrated in FIG. 1B is formed.

Subsequently, a left anode terminal claw portion 22a and a right anode terminal claw portion 22b of the anode terminal claw 22 are curved along the outer periphery of the anode 1. As illustrated in FIG. 1D, the left anode terminal claw portion 22a and the right anode terminal claw portion 22b are formed in advance so as to extend to the left and right from the anode terminal-supporting portion 24 of the anode terminal 4. Thus, the anode-holding portion 7 of the anode terminal 4 illustrated in FIG. 1B is formed.

Next, an end of the anode 1 is held by the anode-holding portion 7 of the anode terminal 4.

Next, a plurality of membrane strips 6 are disposed at intervals on the surface of the body of the rod-shaped or tubular anode 1.

Next, the body of the anode 1 is held by the left cathode claw portions 12a and right cathode claw portions 12b of the cathode claw 12 of the anode-holding portion 5 of the cathode 3 with the plurality of membrane strips 6 therebetween.

The membrane strips 6 may be disposed on the surfaces of the left cathode claw portions 12a and the right cathode claw portions 12b of the cathode claw 12 of the anode-holding portion 5 of the cathode 3 instead of being wound around the body of the anode 1.

Figure 2A:
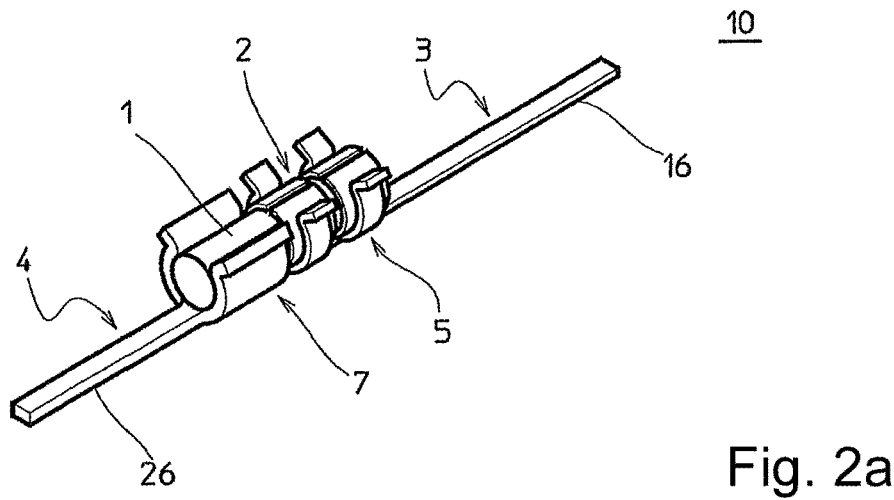
FIG. 2A is a perspective view illustrating a membrane electrode assembly according to another embodiment of the present invention.
Figure 2B:
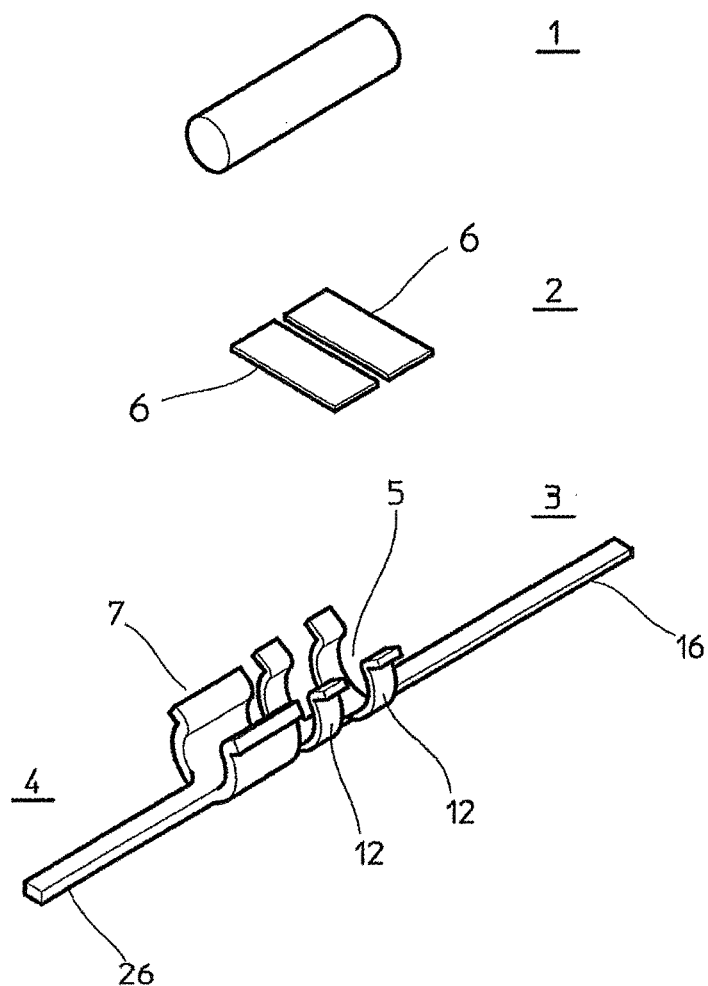
FIG. 2B is an assembling drawing of the membrane electrode assembly illustrated in FIG. 2A, according to another embodiment of the present invention.

FIGS. 2A and 2B illustrate another embodiment of the present invention. FIGS. 2A and 2B illustrate the structure of a both-side terminal membrane electrode assembly that is produced by using the same components as those illustrated in FIGS. 1A to 1D so that the cathode power feed portion 16 and the anode terminal power feed portion 26 extend to both sides of the anode 1.

Next, the components of the present invention will be described.

Anode 1

The anode 1 used in the present invention is a rod-shaped or tubular body composed of an electrically conductive material. An electrode prepared by coating a surface of a base such as a pipe or a rod with an anode catalyst is used as the anode 1. The cross section of the base is preferably selected from a circle, a quadrangle, an ellipse, a hollow circular cylinder, a quadrangular tube, and the like, but is not limited thereto. Examples of the anode catalyst that covers the surface of the base include lead oxide, tin oxide, noble metals such as platinum, noble metal oxides, carbon, and electrically conductive diamond. From the standpoint of corrosion resistance, noble metals such as platinum and iridium, oxides thereof, and electrically conductive diamond are preferably used. The base preferably has a long lifetime and corrosion resistance so as to prevent a treated surface from being contaminated. Valve metals such as titanium and niobium, and alloys thereof are preferably used as the base.

Electrically conductive diamond is believed to be promising as an anode catalyst because the electrical conductivity thereof can be controlled by doping the electrically conductive diamond with a dopant such as boron. It has been reported that electrically conductive diamond is inactive to the decomposition reaction of water, and, in an oxidation reaction, ozone and hydrogen peroxide are produced besides oxygen when electrically conductive diamond is used. The use of electrically conductive diamond allows the electrolytic reaction to easily proceed, and thus these peroxides are significantly efficiently produced by the electrolysis. Furthermore, when electrically conductive diamond is used, an OH radical and an oxidant of an electrolyte are produced in addition to the above electrolyte species. Thus, the effect of sterilization and bleaching due to these reaction products and the above electrolyte species can be synergistically used.

When electrically conductive diamond is used, not only (single-crystal or polycrystalline) Si but also Nb, Ta, Zr, Ti, Mo, W, graphite, carbides, etc. can be used as the base. The material of the base can be appropriately selected according to the use.

The length and the diameter of the anode 1 are selected on the basis of the amount of reaction products required (such as the amount of water and the concentration). The anode 1 preferably has a length of 3 mm or more and 100 mm or less, and an outer diameter of 0.5 mm or more and 10 mm or less.

The cross section of the anode 1 is preferably selected from a circle, a quadrangle, an ellipse, a hollow circular cylinder, a quadrangular tube, and the like, but is not limited thereto.

Irregularities may be formed on the surface of the anode 1. Alternatively, when the anode 1 is composed of a hollow material, openings may be formed in the surface of the anode 1. These irregularities and openings are effective to enhance gas-liquid permeability.

Membrane 2

A neutral membrane or an ion exchange membrane can be used as the membrane 2 in order to stably maintain active substances produced by the electrode reaction. The membrane may be composed of a fluororesin or a hydrocarbon resin. However, from the standpoint of corrosion resistance to ozone and peroxides, the former resin is preferable. An ion exchange membrane has a function of preventing substances produced on the anode and the cathode from being consumed on the opposite electrodes and allowing the electrolysis to rapidly proceed even in the case where a liquid has a low electrical conductivity. Accordingly, an ion exchange membrane is preferably used in the case where a liquid having a poor electrical conductivity, for example, pure water, is used as a raw material.

Forming irregularities on a surface of the membrane 2 or forming openings in a surface of an electrode is preferable because gas-liquid permeability can be enhanced.

The use of an ion exchange membrane as the membrane 2 prevents substances produced on the anode 1 and the cathode 3 from being consumed on the opposite electrodes and allows the electrolysis to rapidly proceed even in the case where a liquid has a low electrical conductivity. Accordingly, an ion exchange membrane is preferably used in the case where a liquid having a poor electrical conductivity, for example, pure water, is used as a raw material. When an ion exchange membrane is used as the membrane 2, the ion exchange membrane may be composed of a fluororesin or a hydrocarbon resin. However, from the standpoint of corrosion resistance to ozone and peroxides, the former resin is preferable.

The membrane 2 preferably has a thickness of 0.1 mm or more and 2 mm or less, and a width of 0.2 mm or more and 5 mm or less. When the width of the membrane 2 is smaller than the above, the physical strength of the membrane 2 becomes insufficient and thus the membrane 2 is easily cut. When the width of the membrane 2 is larger than the above, the mass transfer of the raw material of the electrolysis and the products from a gap is suppressed, resulting in an increase in the voltage and a decrease in the current efficiency. When a plurality of membrane strips 6 are used as the membrane 2, the gap between the membrane strips 6 is preferably about 0.1 to 10 mm. It is also preferable to provide openings in the membrane 2 in advance to enhance gas-liquid permeability of the membrane electrode assembly. The dimension of each of the openings is preferably 1 to 10 mm in terms of perimeter of the section.

Cathode 3

The anode-holding portion 5 of the cathode 3 used in the present invention has electrical conductivity and preferably has springiness because it is necessary to hold the anode-holding portion 5. In addition, the anode-holding portion 5 of the cathode 3 preferably has high oxidation resistance because ozone and peroxides are dissolved in electrolyzed water produced by the electrolysis.

The reaction in the cathode 3 is mainly the hydrogen generation. A base of the cathode 3 is preferably composed of, for example, stainless steel, zirconium, or nickel. On the surface of the base, a platinum group metal, nickel, zirconium, gold, silver, carbon, diamond, or the like may be provided as a cathode catalyst that is not embrittled by hydrogen.

The plate thickness of the cathode 3 is usually preferably 0.1 to 3.0 mm in order to moderately hold the membrane on the anode rod, though it depends on the amount of power supplied.

Anode Terminal 4

The anode terminal 4 used in the present invention holds the anode 1 in a fitting manner or a sliding manner, and thus the material of the anode terminal 4 has electrical conductivity. Since the anode terminal 4 needs to hold the anode 1, the anode terminal 4 preferably has springiness.

An electrolyzed water production device in the present invention usually has a one-chamber structure. By the electrolysis, acidic electrolyzed water is produced on the anode side and alkaline electrolyzed water is produced on the cathode side. However, the acidic electrolyzed water and the alkaline electrolyzed water are produced as mixed electrolyzed water.

In the present invention, when the raw material water is supplied to the electrolyzed water production device and power is supplied to the device, the raw material water contacts the anode and the cathode in the electrolyzed water production device and is electrolyzed to produce electrolyzed water.

Figure 3A:
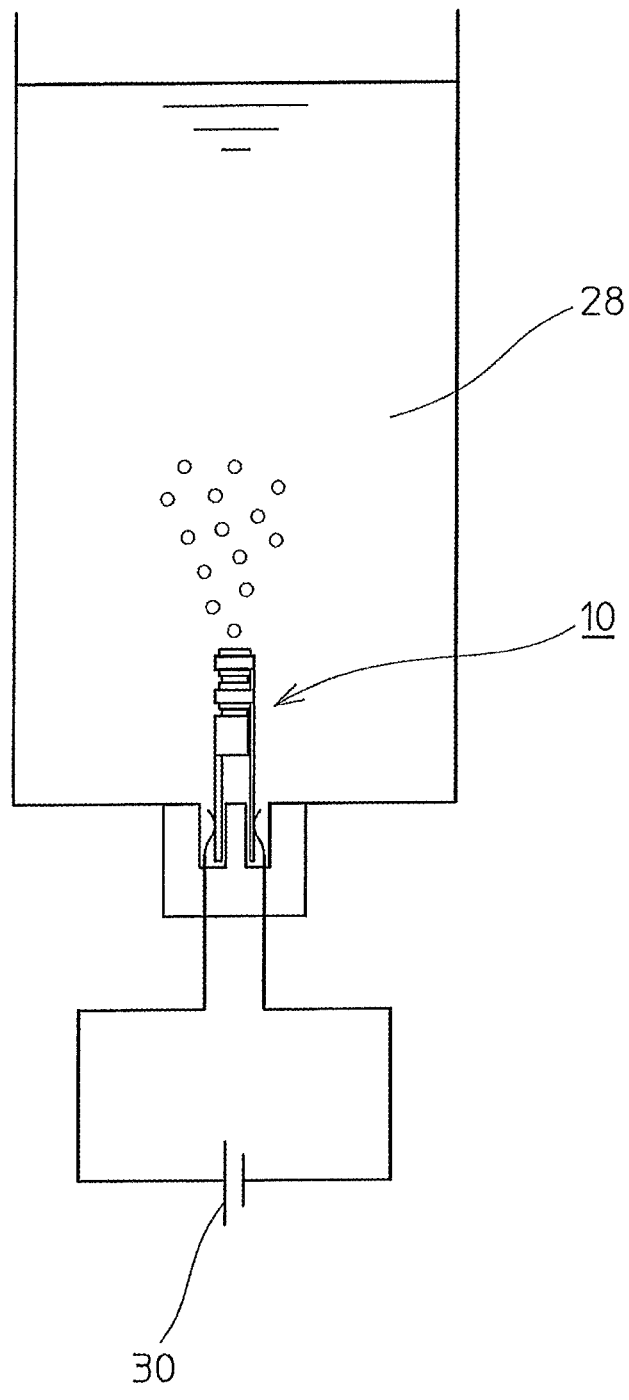
FIG. 3A is a view illustrating an electrolyzed water production device according to an embodiment of the present invention.

FIG. 3A illustrates an electrolyzed water production device according to an embodiment of the present invention. A membrane electrode assembly 10 is connected to a power feed portion provided in a container 28. Raw material water is supplied to the container 28, and power is supplied from a power supply 30 to the membrane electrode assembly 10, thereby electrolyzing the raw material water. Thus, electrolyzed water is produced.

Figure 3B:
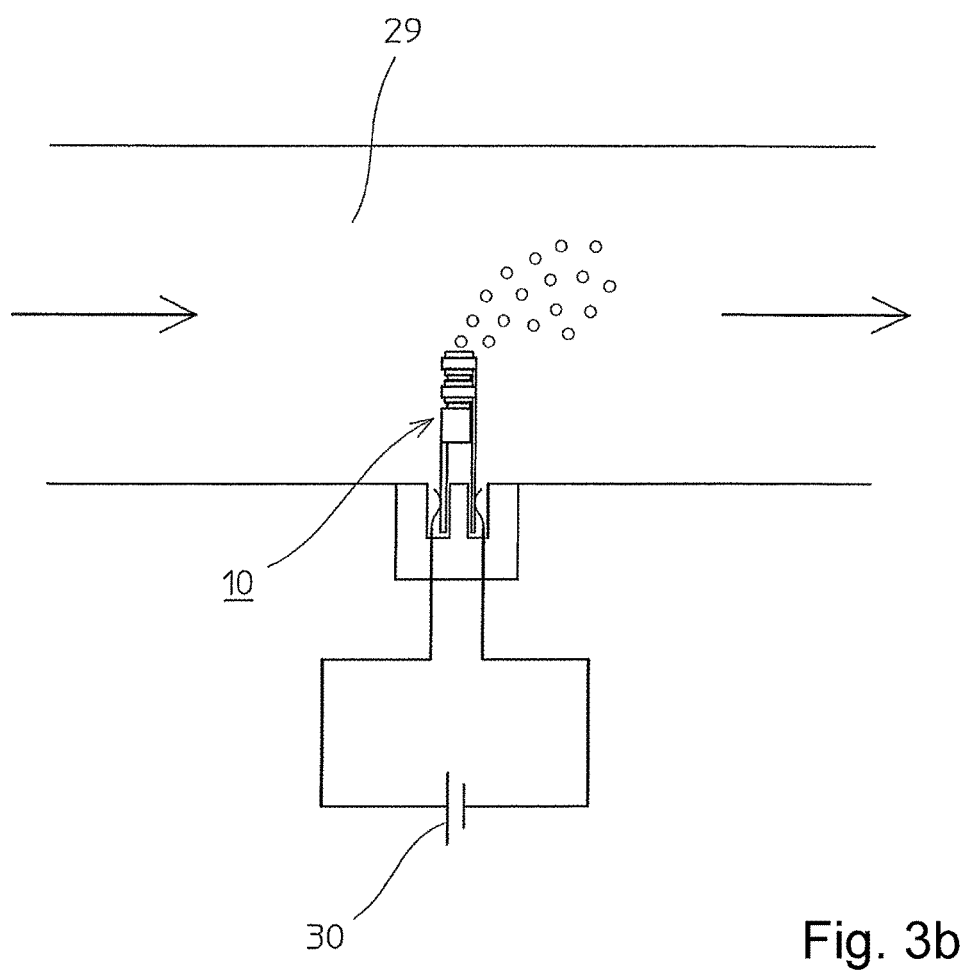
FIG. 3B is a view illustrating an electrolyzed water production device according to another embodiment of the present invention.

FIG. 3B illustrates an electrolyzed water production device according to another embodiment of the present invention. A membrane electrode assembly 10 is connected to a power feed portion provided in a water flow portion 29 of raw material water, for example, a water supply line. Power is supplied from a power supply 30 to the membrane electrode assembly 10 while the raw material water is continuously supplied to the water flow portion 29, thereby electrolyzing the raw material water. Thus, similar, active electrolyzed water is produced.

A material that is not corroded by the raw material water is selected as the material of a tank functioning as the container in which the raw material water is stored or the material of the water flow portion such as a water supply line.

Regarding the electrolysis conditions, the temperature is preferably 5° C. to 40° C. and the current density is preferably 0.01 to 1 A/cm$^2$ from the standpoint of stability and activity of the produced substances.

The membrane electrode assembly illustrated in FIG. 1A is a one-side terminal membrane electrode assembly in which the cathode power feed portion 16 and the anode terminal power feed portion 26 extend from one side of the anode 1. In the case where this membrane electrode assembly is used, a socket for attaching a clip-type electrode, the socket being illustrated in FIG. 3A or 3B, is preferably prepared. With this structure, a wiring connection work, which has been hitherto performed by using a crimp contact, welding, soldering, or the like, can be performed by simply inserting a terminal of an electrode into the socket. In addition, the electrode is easily detached from the socket. Thus, a replacement work of the electrode is also easily performed.

As described above, in the one-side terminal membrane electrode assembly in which the cathode power feed portion 16 and the anode terminal power feed portion 26 extend from one side of the anode 1, the connection of an electrode and a maintenance property (attachment and detachment of the electrode) are markedly improved. For example, Ti or stainless steel, which has high corrosion resistance, is preferably used as the material of a power-feed metal fitting of the socket that contacts the anode terminal and the cathode.

Raw Material Water and Electrolyzed Water Produced

Pure water, soft water, tap water, well water, or the like can be used as the raw material water. When tap water or well water is used as the raw material water, the water is preferably controlled to be slightly acidic in order to suppress deposition of Ca and Mg.

In the case where the raw material water has a low conductivity and a ratio of the resistance loss with respect to the cell voltage is not negligible, it is preferable to increase the conductivity. In such a case, a salt such as $Na_2SO_4$, $K_2SO_4$, NaCl, KCl, or $Na_2CO_3$ is preferably dissolved in the raw material water as an electrolyte. These salts may produce peroxides as a result of electrolysis and bear a residual effect of sterilization. The concentration of the salt is preferably in the range of 0.01 to 10 g/L. An electrode composed of platinum or the like has a property that the presence of a chloride ion increases the efficiency of the production of ozone. Accordingly, the raw material water is preferably prepared in consideration of this property.

When the target of the treatment is water having a high content of metal ions, such as tap water and well water, a hydroxide or a carboxide may be deposited on the surface of the cathode, thereby inhibiting the reaction. In addition, an oxide such as silica is deposited on the surface of the anode. As a countermeasure for this, an inverse current may be supplied at appropriate intervals (at intervals of one minute to one hour). In this case, acidification occurs in the cathode and alkalization occurs in the anode, and thus an elimination reaction of the deposit easily proceeds as a result of acceleration by the flow of generated gas and supplied water. Alternatively, the membrane electrode assembly may be washed with an acid at regular intervals.

The composition and the concentration of the electrolyzed water produced can be controlled in line with the purpose. For the treatment of food, alkaline electrolyzed hypochlorite water, slightly acidic electrolyzed water, or ozone water should be produced. For sterilization and bleaching, peroxides are appropriately selected in accordance with the target of the treatment. The concentration of hypochlorous acid is 1 to 100 ppm, the concentration of ozone water is 1 to 20 ppm, the concentration of persulfuric acid is 1 to 100 ppm, and the concentration of percarbonic acid is 1 to 100 ppm.

EXAMPLES

An Example relating to the production of electrolyzed water according to the present invention will now be descried. However, the present invention is not limited thereto.

Example 1

An electrically conductive diamond electrode having a diameter of 2 mm and a length of 8 mm was used as an anode 1. A stainless steel plate (SUS 304, thickness: 0.3 mm) was used as a cathode 3. Two strips of an ion exchange membrane (Nafion (registered trademark) 324 manufactured by DuPont, thickness: 0.152 mm, width: 2 mm) were used as a membrane 2. The strip-shaped ion exchange membranes were sandwiched between the anode 1 and the cathode 3 having two claws to prepare an anode-membrane-cathode assembly. Ion-exchange water (flow rate: 80 mL/min) was used as raw material water. A test was conducted by using the above membrane electrode assembly at a current of 0.056 A. The ozone water concentration in a solution produced after one hour from the start of the electrolysis was 0.26 ppm.

Comparative Example 1

An electrically conductive diamond electrode having a diameter of 2 mm and a length of 50 mm was used as an anode. A stainless wire (SUS 304, diameter: 0.5 mm) was used as a cathode. A strip of an ion exchange membrane (Nafion (registered trademark) 324 manufactured by DuPont, thickness: 0.152 mm, width: 2 mm) was used as an ion exchange membrane. The cathode and the ion exchange membrane were wound around the anode two times in a spiral manner. Thus, a membrane electrode assembly was tried to be produced.

However, in producing the compact membrane electrode assembly described above, even when the cathode wire was wound using an existing winding machine, the cathode wire was easily unwound. A membrane electrode assembly that can be used in an electrolyzed water production device could not be obtained.

The above results showed that the compact or portable electrolyzed water production device according to a present invention could not be obtained by using the existing wound-type membrane electrode assembly.

According to the present invention, the following advantages are achieved by reducing the size of a membrane electrode assembly by adopting a novel clip-type electrode structure instead of the existing wound-type electrode structure. Specifically, the degree of freedom of the installation location of a membrane electrode assembly can be increased to increase the versatility of the compact membrane electrode assembly. Electrolyzed water having a stable quality can be produced by holding an ion exchange membrane on an anode at a stable pressure. In addition, the fabrication of the membrane electrode assembly is simplified to improve productivity. The membrane electrode assembly can be produced by using an inexpensive fitting machine without using an expensive winding machine, and thus the cost of equipment can be reduced. Thus, the membrane electrode assembly according to the present invention can be used in the field of the use of electrolyzed water produced by a portable or compact device.

The invention claimed is:

1. A membrane electrode assembly comprising:
    a rod-shaped or tubular anode;
    an anode terminal connected to the anode;
    a cathode comprising a line or strip-shaped cathode-supporting portion having at least a pair of curved cathode claws extending from a left side and a right side of the line or strip-shaped cathode-supporting portion, the curved cathode claws embracing the anode along an outer periphery of the anode, wherein the cathode-supporting portion and the curved cathode claws form an anode-holding portion to hold the anode;
    a cathode terminal connected to the cathode; and
    membrane strips that separate the anode and the cathode from each other, wherein the membrane strips are disposed on and in contact with the curved cathode claws such that the anode is held by the anode-holding portion of the cathode with the membrane strips therebetween.

2. The membrane electrode assembly according to claim 1, wherein the cathode terminal and the anode terminal have a power feed portion respectively, and both power feed portions are arranged to extend in the same direction.

3. The membrane electrode assembly according to claim 1, wherein the curved cathode claws extend from the cathode-supporting portion in a bilaterally symmetric manner.

4. The membrane electrode assembly according to claim 1, wherein more than one pair of the left and right curved cathode claws are provided, and the curved cathode claws extend in a comb-like or teeth-like manner to both left and right sides from the cathode-supporting portion.

5. The membrane electrode assembly according to claim 3, wherein the membrane strips are arranged to be in contact with both left and right curved cathode claws continuously.

6. The membrane electrode assembly according to claim 1, wherein a tip of the curved cathode claws are curved outward so that the anode-holding portion of the cathode has the shape of the letter "Ω" when viewed from an axial direction of the anode.

7. The membrane electrode assembly according to claim 1, wherein the anode terminal has a line or strip-shaped anode terminal-supporting portion and anode terminal claws that extend to a left side and a right side from the anode terminal-supporting portion, the anode terminal claws being curved along the outer periphery of the anode, and
    the anode terminal-supporting portion together with the anode terminal claws form the anode-holding portion of the anode terminal for holding the anode.

8. The membrane electrode assembly according to claim 7, wherein the anode terminal claws are curved so that the anode-holding portion of the anode terminal has the shape of the letter "Ω" or "C" when viewed from an axial direction of the anode.

9. The membrane electrode assembly according to claim 1, wherein the anode has a length of 3 mm-100 mm.

10. The membrane electrode assembly according to claim 1, wherein the anode has an outer diameter of 0.5 mm-10 mm.

11. The membrane electrode assembly according to claim 1, wherein the membrane strips have a thickness of 0.1 mm 2 mm.

12. The membrane electrode assembly according to claim 1, wherein the membrane strips have a width of 0.2 mm-5 mm.

13. The membrane electrode assembly according to claim 1, wherein the anode is an electrically conductive diamond electrode.

14. The membrane electrode assembly according to claim 1, wherein the membranes are an ion exchange membrane.

15. An electrolyzed water production device configured to produce electrolyzed water by electrolyzing raw material water using the membrane electrode assembly according to claim 1.

16. The electrolyzed water production device according to claim 15, further having a container that stores the raw material water, wherein the raw material water is electrolyzed by supplying power to the membrane electrode assembly to produce electrolyzed water.

17. The electrolyzed water production device according to claim 15, further having a water flow portion through which the raw material water is allowed to pass, wherein the raw material water is electrolyzed by supplying power to the membrane electrode assembly to produce electrolyzed water.

* * * * *